United States Patent
Sapozhnikov et al.

(10) Patent No.: US 9,153,250 B2
(45) Date of Patent: Oct. 6, 2015

(54) MAGNETORESISTIVE SENSOR

(71) Applicant: Seagate Technology LLC, Cupertino, CA (US)

(72) Inventors: Victor Boris Sapozhnikov, Minnetonka, MN (US); Taras Grigoryevich Pokhil, Arden Hills, MN (US); Mohammed Sharia Ullah Patwari, Eden Prairie, MN (US)

(73) Assignee: SEAGATE TECHNOLOGY LLC, Cuperino, CA (US)

( * ) Notice: Subject to any disclaimer, the term of this patent is extended or adjusted under 35 U.S.C. 154(b) by 0 days.

(21) Appl. No.: 13/955,542

(22) Filed: Jul. 31, 2013

(65) Prior Publication Data

US 2015/0036245 A1 Feb. 5, 2015

(51) Int. Cl.
*G11B 5/39* (2006.01)
*G11B 5/11* (2006.01)

(52) U.S. Cl.
CPC .............. *G11B 5/11* (2013.01); *G11B 5/3912* (2013.01)

(58) Field of Classification Search
CPC ........ G11B 5/3912; G11B 5/398; G11B 5/11; G11B 5/3932; G11B 5/1278
USPC .......................................................... 360/319
See application file for complete search history.

(56) References Cited

U.S. PATENT DOCUMENTS

| | | | |
|---|---|---|---|
| 6,496,335 B2 | 12/2002 | Gill | |
| 7,180,712 B1 | 2/2007 | Li et al. | |
| 7,606,007 B2 | 10/2009 | Gill | |
| 7,706,108 B2 | 4/2010 | Gill | |
| 7,961,438 B2 | 6/2011 | Mizuno et al. | |
| 7,974,048 B2 | 7/2011 | Shimazawa et al. | |
| 8,049,997 B2 | 11/2011 | Miyauchi et al. | |
| 8,179,642 B2 * | 5/2012 | Kawamori et al. | 360/319 |
| 8,189,303 B2 | 5/2012 | Hara et al. | |
| 8,305,715 B2 * | 11/2012 | Mauri et al. | 360/319 |
| 8,437,106 B2 * | 5/2013 | Yanagisawa et al. | 360/319 |
| 8,451,567 B2 * | 5/2013 | Zhou et al. | 360/324.12 |
| 8,531,801 B1 * | 9/2013 | Xiao et al. | 360/319 |
| 8,630,068 B1 * | 1/2014 | Mauri et al. | 360/319 |
| 8,630,069 B1 * | 1/2014 | Okawa et al. | 360/319 |
| 2009/0279213 A1 | 11/2009 | Wu et al. | |
| 2010/0027168 A1 | 2/2010 | Chou et al. | |
| 2010/0039734 A1 | 2/2010 | Hara et al. | |
| 2010/0067148 A1 | 3/2010 | Tsuchiya et al. | |
| 2010/0149689 A1 * | 6/2010 | Tsuchiya et al. | 360/234.3 |
| 2011/0007925 A1 | 1/2011 | Akino | |
| 2011/0267720 A1 * | 11/2011 | Fernandez-de-Castro | 360/319 |
| 2012/0063035 A1 | 3/2012 | Childress et al. | |
| 2012/0327537 A1 | 12/2012 | Singleton et al. | |
| 2014/0104729 A1 * | 4/2014 | Singleton et al. | 360/319 |
| 2014/0160596 A1 * | 6/2014 | Sapozhnikov et al. | 360/125.12 |

* cited by examiner

*Primary Examiner* — Will J Klimowicz
(74) *Attorney, Agent, or Firm* — HolzerIPLaw, PC (57) ABSTRACT

An apparatus disclosed herein comprises a magnetically free layer and a bottom shield, wherein a first portion of the bottom shield substantially adjacent the free layer is pinned perpendicular to an air-bearing surface (ABS) of the apparatus and a second portion of the bottom shield not substantially adjacent the free layer is pinned parallel to the ABS of the apparatus.

20 Claims, 6 Drawing Sheets

MAGNETORESISTIVE SENSOR

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An apparatus disclosed herein comprises a magnetically free layer and a bottom shield, wherein a first portion of the bottom shield substantially adjacent the free layer is pinned perpendicular to an air-bearing surface (ABS) of the apparatus and a second portion of the bottom shield not substantially adjacent the free layer is pinned parallel to the ABS of the apparatus. These and various other features and advantages will be apparent from a reading of the following detailed description.

DETAILED DESCRIPTIONS

There is an increasing demand for high data densities and sensitive sensors to read data from a magnetic media. Giant Magnetoresistive (GMR) sensors that have increased sensitivity consist of two ferromagnetic layers separated by a thin conductive, non-magnetic spacer layer such as copper. In Tunnel Magnetoresistive (TMR) sensors the electrons travel in the direction perpendicular to the layers across a thin insulating barrier. An antiferromagnetic (AFM) material is placed adjacent to the first magnetic layer (called pinned layer (PL)) to prevent it from rotation. AFM materials exhibiting this property are termed "pinning materials". With its rotation inhibited, the first soft layer is termed the "pinned layer". The second soft layer rotates freely in response to an external field and is called the "free layer (FL)."

To operate the MR sensor properly, the sensor should be stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. In order to increase the stiffness of the PL, "synthetic antiferromagnet" (SAF) is used instead of the PL. The use of the AFM/SAF allows for consistent and predictable orientation of the SAF structure. Furthermore, the use of AFM/SAF also provides stable structure to enable high amplitude linear response for a reader using the MR sensor.

However, using the AFM/SAF structure increases the shield-to-shield spacing (SSS) of the reader. As the pulse width fluctuations PW50 of magnetic sensors, which determine the signal-to-noise (SNR) ratio in a recording system depends on the SSS of the header, achieving a lower SSS results in lower PW50 and increased SNR. An example of the relationship between the PW50 and SSS, as suggested by both modeling and experiments can be given as follows:

$$\Delta PW50 \cong 0.3 * \Delta SSS$$

Thus, a reduction in the SSS leads to reduction in the value of the PW50 and therefore, an increase in the value of the SNR for the recording system. Thus, higher linear density of the reader can be achieved by reducing the SSS. Furthermore, smaller SSS also improves the cross-track resolution of the media reader and such reduction in cross-track resolution contributes to further improvement of the areal density that can be achieved by the media reader.

In one implementation, the SSS is reduced by removing the AFM and SAF layer from a sensor stack and by providing a bottom shield including a synthetic antiferromagnetic (SAF) structure. Specifically, in such an implementation, the SAF structure includes a reference layer (RL) and a pinned layer (PL) separated by a thin layer of non-magnetic material, such as ruthenium (Ru) to provide RKKY coupling between the RL and the PL. Providing the SAF structure in the bottom shield has the effect of decreasing the SSS, however, such a shields have a potential instability problem in the cross-track direction.

For example, in a bottom shield having an SAF structure the presence of demagnetization field causes the shield magnetization at the ABS to be tilted in one of the two cross-track directions. Such magnetization flipping at the ABS in the presence of the demagnetization field causes the shield magnetization to switch between these two directions. This results in significant hysteresis with two states at zero field, and is bad for the stability of the reader in the presence of cross-track demagnetization.

An implementation of an MR sensor disclosed herein achieves bottom shield stabilization by providing a bottom shield wherein a first portion of the bottom shield substantially adjacent the free layer is pinned perpendicular to an air-bearing surface (ABS) of the apparatus and a second portion of the bottom shield not substantially adjacent the free layer is pinned parallel to the ABS of the apparatus.

Figure 1:
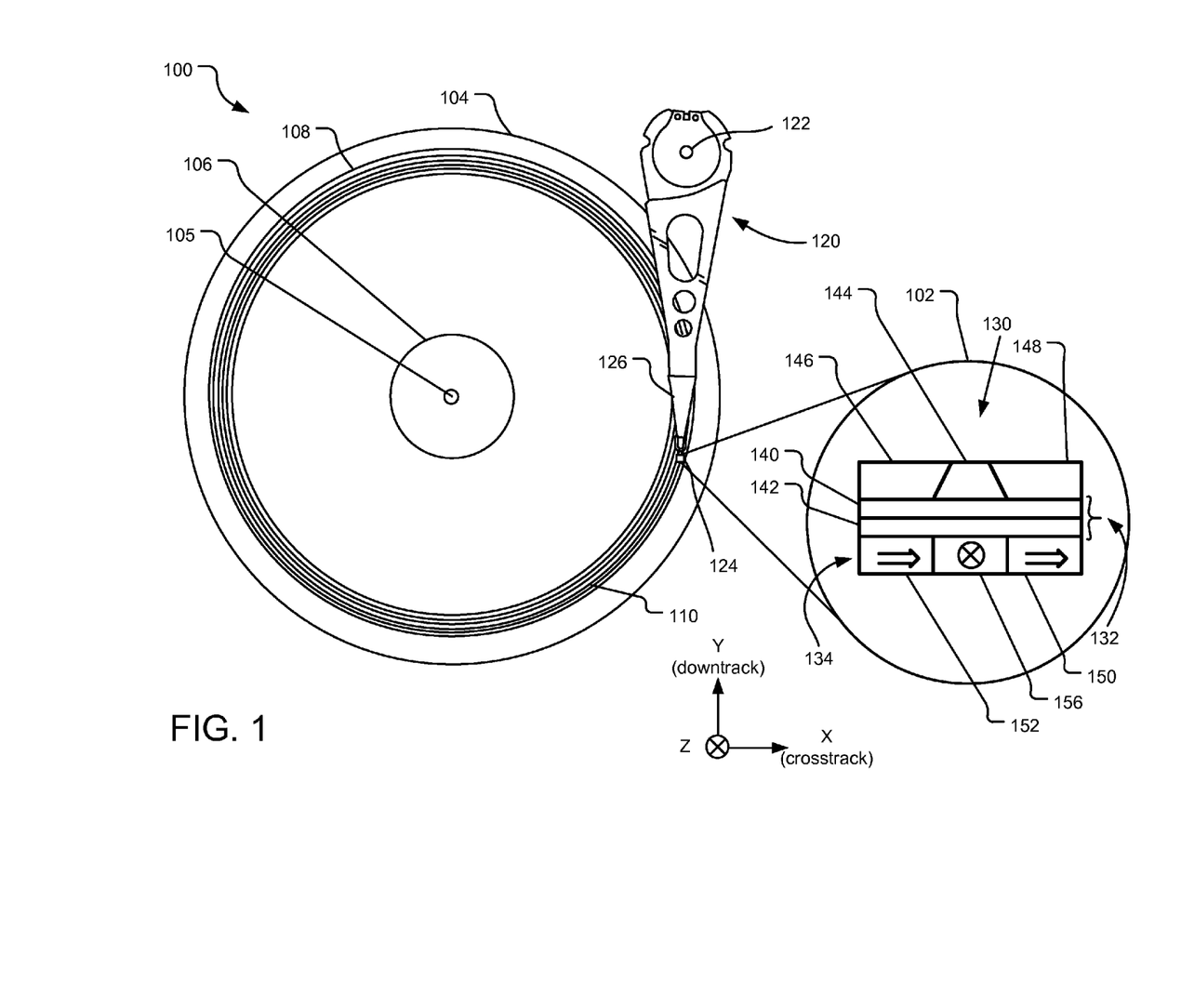
FIG. 1 illustrates a data storage device having an example MR sensor.

FIG. 1 illustrates a data storage device 100 having an example MR sensor, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks 110 on the storage medium 104. A transducer head assembly 124 is mounted on an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

The exploded view 102 schematically illustrates an air-bearing surface (ABS) view of an MR sensor 130. The MR sensor 130 includes a bottom shield 132 and a sensor stack 144 in contact with the bottom shield 132. The sensor stack 144 may include a free layer (not shown) and a first barrier layer (not shown) wherein the barrier layer may be in contact with the bottom shield 132. Yet alternatively, the sensor stack 144 may also include a second barrier layer (not shown) between the free layer and a top shield (not shown) that is on the other side of the sensor compared to the bottom shield in a down track direction.

In one implementation, the bottom shield 132 includes an SAF structure including an SAF reference layer (RL) 140 and an SAF pinned layer (PL) 142, wherein the RL and the PL are separated by a non-magnetic layer. The MR sensor 130 also includes an antiferromagnetic (AFM) layer 134 beneath the bottom shield 132 which may be used to pin the PL 142 of the bottom shield 132. In one implementation, the AFM layer 134 is structured so that the pinning in different sections of the bottom shield 132 has different magnetization. For example, the AFM layer 134 may have a first section 150 that pins the PL 142 of the bottom shield 132 in a cross-track direction, a second section 156 that pins the PL 142 of the bottom shield 132 in a transverse direction, and a third section 152 that pins the PL 142 of the bottom shield 132 in a cross-track direction. As a result, the magnetization in the bottom shield 132 in a window in the vicinity of the sensor stack 144 is in a transverse direction (transverse to the ABS). Specifically, the direction of magnetization in each of the PL 140 and the RL 142 are in a direction transverse to the ABS, however, the directions of magnetization in the PL 140 and the RL 142 are anti-parallel or opposite each other. The differentiated magnetization directions, transverse to ABS in a window in vicinity of the sensor stack and parallel to ABS otherwise, reduces the flipping of the direction of magnetization at the ABS in the presence of demagnetization and results in increased cross-track stability of the MR sensor 130.

The MR sensor 130 also includes permanent magnets (PMs) 146 and 148 on two sides (in a cross-track direction) of the sensor stack 144. Alternatively, when the AFM 134 is provided with parallel pinning fields in sections 150 and 152, the PMs 146 and 148 may be replaced with side shields. In one implementation, the differentiated magnetization within the bottom shield 132 may be achieved using biasing achieved through the PMs 146 and 148. Specifically, the PMs 146 and 148 may magnetize the sections of the bottom shield 132 away from the sensor stack 144 (in a cross-track direction) in a direction that is parallel to the ABS. In such an implementation, the AFM 134 may pin the section of the bottom shield 132 in the vicinity of the sensor stack 144 in a transverse direction to the ABS. Such transverse magnetization in the bottom shield 132 improves the cross-track stability of the MR sensor 130, while also maintaining the advantages of providing the SAF in the bottom shield 132 and the resulting decrease in the PW50.

Figure 2:
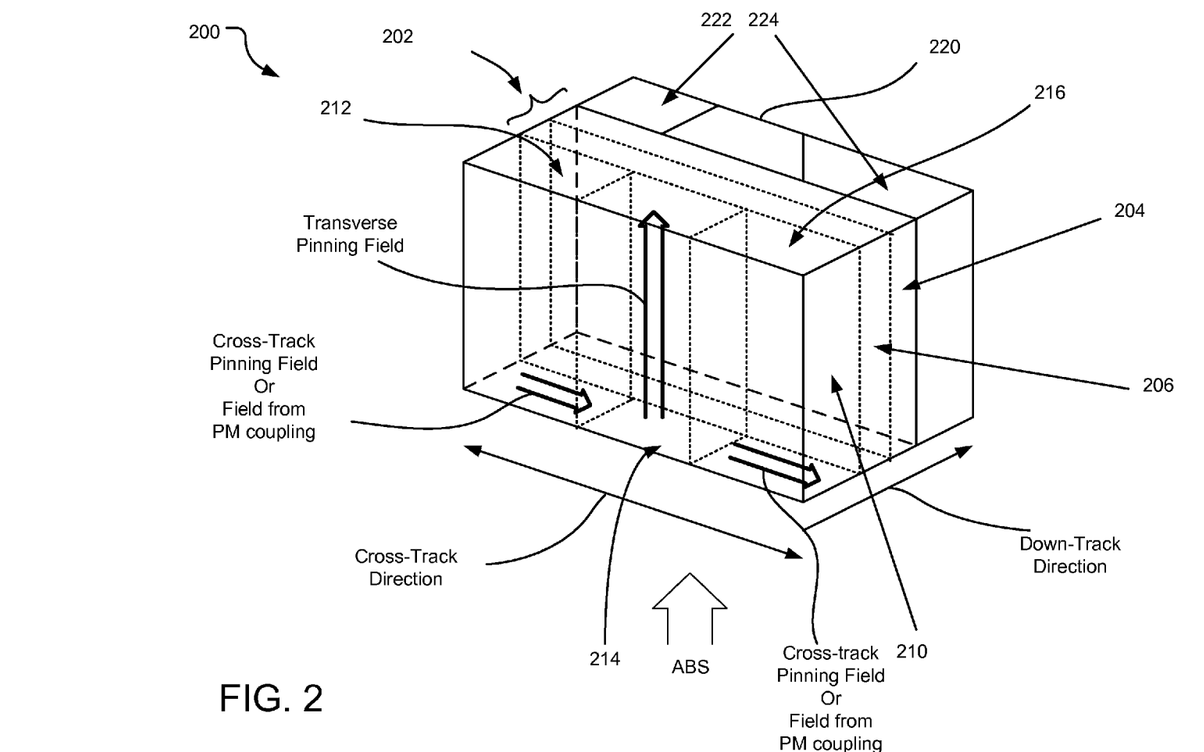
FIG. 2 illustrates a three-dimensional view of an example implementation of an MR sensor.

FIG. 2 illustrates a three-dimensional view of an example implementation of an MR sensor 200. The MR sensor 200 includes a bottom shield 202 including an SAF structure. Specifically, the SAF structure includes an RL 204 and a PL 206, wherein the RL 204 and the PL 206 are separated from each other by a thin layer of non-magnetic material, such as ruthenium (Ru) to provide RKKY coupling between the RL 204 and the PL 206. The PL 206 may be pinned using an AFM layer 210. In an implementation, the AFM layer 210 is divided into three sections along cross-track direction. Specifically, the AFM layer 210 includes a left AFM layer 212, a center AFM layer 214, and a right AFM layer 216.

In one implementation, the left AFM layer 212 and the right AFM layer 216 are configured to have pinning fields that are parallel to the ABS of the MR sensor 200 (as shown in FIG. 2, the ABS faces towards the bottom of the page). As a result, the directions of magnetization in the sections of the bottom shield 202 towards the left end and the right end (in cross-track direction) are also parallel to the ABS. Specifically, the direction of magnetization in the PL 206 and the RL 204 are parallel to the ABS, but anti-parallel to each other. Furthermore, the center AFM layer 214 is configured to provide pinning field that is transverse to the ABS. As a result, the direction of magnetization in the center section of the bottom shield 202 is also transverse to the ABS of the MR sensor 200. Specifically, the directions of magnetization in the RL 206 and the PL 204 of the bottom shield 202 are transverse to the ABS of the MR sensor 200, however, they are both anti-parallel to each other.

In an alternative implementation, the MR sensor 200 may provide alternative structure for the AFM layer 210 wherein the left AFM layer 212 and the right AFM layer 216 may be replaced with PMs. In such an implementation, the PMs may be located on two sides (in cross-track direction) of the center AFM layer 214. The PMs may provide direct coupling to the left and right sections of the bottom shield 202. In one implementation, the PMs are configured to pin the right and left sections of the bottom shield 202 to have directions of magnetization that are parallel to the ABS of the MR sensor 200.

The MR sensor 200 also includes a sensor stack 220. Specifically, the sensor stack 220 may include a sensor stack pinned layer, a sensor stack reference layer, and a sensor stack cap and free layer structure (not shown). The senor stack 220 is surrounded by side shields 222 and 224. In an alternative implementation, the sensor stack 220 is surrounded by permanent magnets in place of the side shield 222 and 224. In yet alternative implementation, a top shield (not shown) may be provided on the other side of the sensor stack (in a down-track direction).

Figure 3:
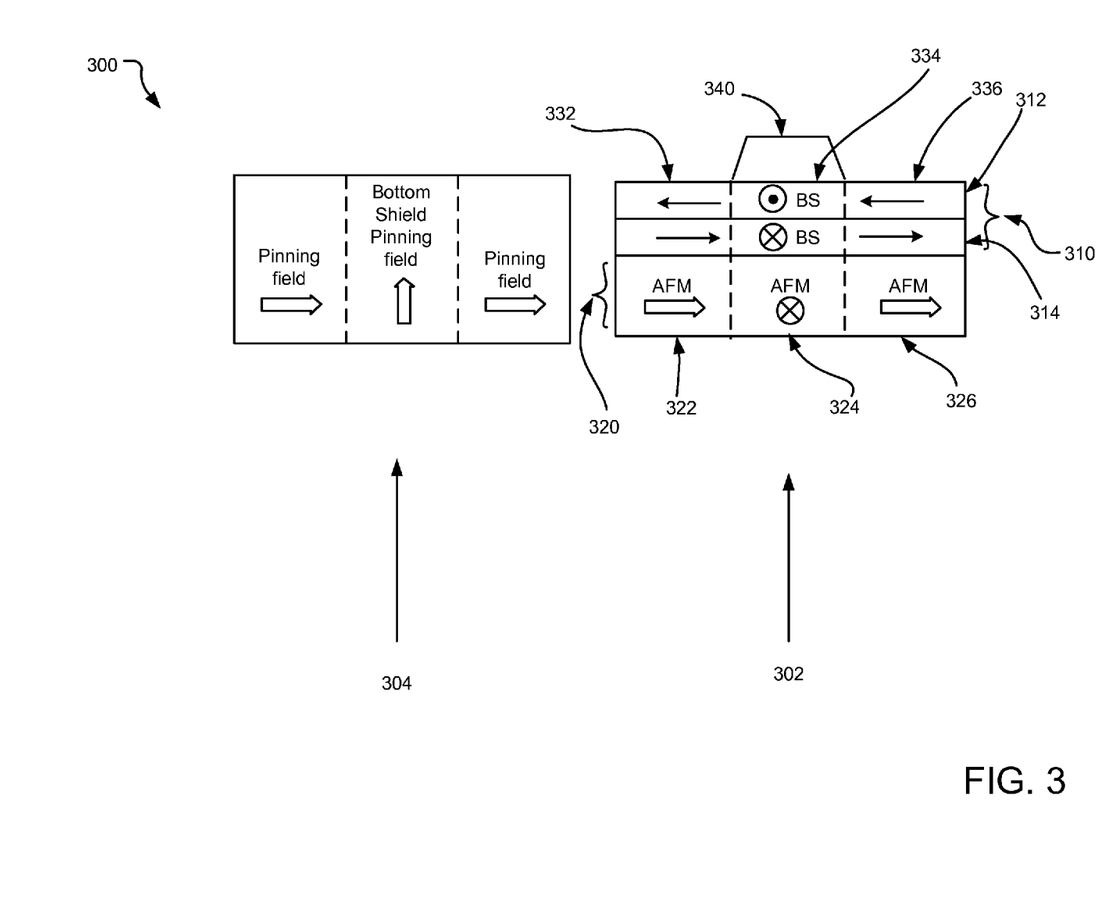
FIG. 3 illustrates an ABS view of an example implementation of an MR sensor.

FIG. 3 illustrates an ABS view 302 and a top view 304 of an example implementation of an MR sensor 300. Specifically, the ABS view 302 illustrates a bottom shield 310 including an RL 312 and a PL 314. The RL 312 and the PL 314 are separated by a thin layer of non-magnetic material (not shown), such as ruthenium (Ru) to provide RKKY coupling between the RL 312 and the PL 314. The MR sensor 300 also includes an AFM layer 320 on a side of the bottom shield (in a down-track direction). The AFM layer 320 may be divided into three sections in a cross-track direction, namely a left AFM layer 322, a center AFM layer 324, and a right AFM layer 326.

As illustrated in the ABS view 302, the left AFM layer 322 and the right AFM layer 326 each provides pinning fields that are parallel to the ABS. On the other hand, the center AFM layer 324 provides pinning field that is transverse to the ABS (as shown by the field into the paper). As a result, the direction of magnetization in the bottom shield 310 also varies depending on the cross-track location within the bottom shield 310. Specifically, in the center section 334 of the bottom shield 310, the direction of magnetization is transverse to the ABS, whereas the directions of pinning in the left section 332 and the right section 336 of the bottom shield 310 are parallel to the ABS.

The MR sensor 300 also includes a sensor stack 340 that is adjacent to the bottom shield 310. In one implementation, the sensor stack 340 is adjacent to the center section 334 of the bottom shield 310. Providing cross-track magnetization in sections 322 and 326 results in increased stability of the MR sensor. In other words, such cross-track magnetization reduces the flipping of the free layer (not shown) within the sensor stack 340 in response to coupling of the free layer to a writer element or an exterior stray field.

The cross-track width of the center section 334 and that of the center AFM layer 324 may be determined based on the cross-track width of the sensor stack 340. In one example implementation, the cross-track width of the center section 334 and the center AFM layer 324 are in the range of 200 to 400 nm. The top view 304 of the MR sensor 300 illustrates the direction of the bottom shield pinning fields in the left section 332, the center section 334, and the right section 336.

Figure 4:
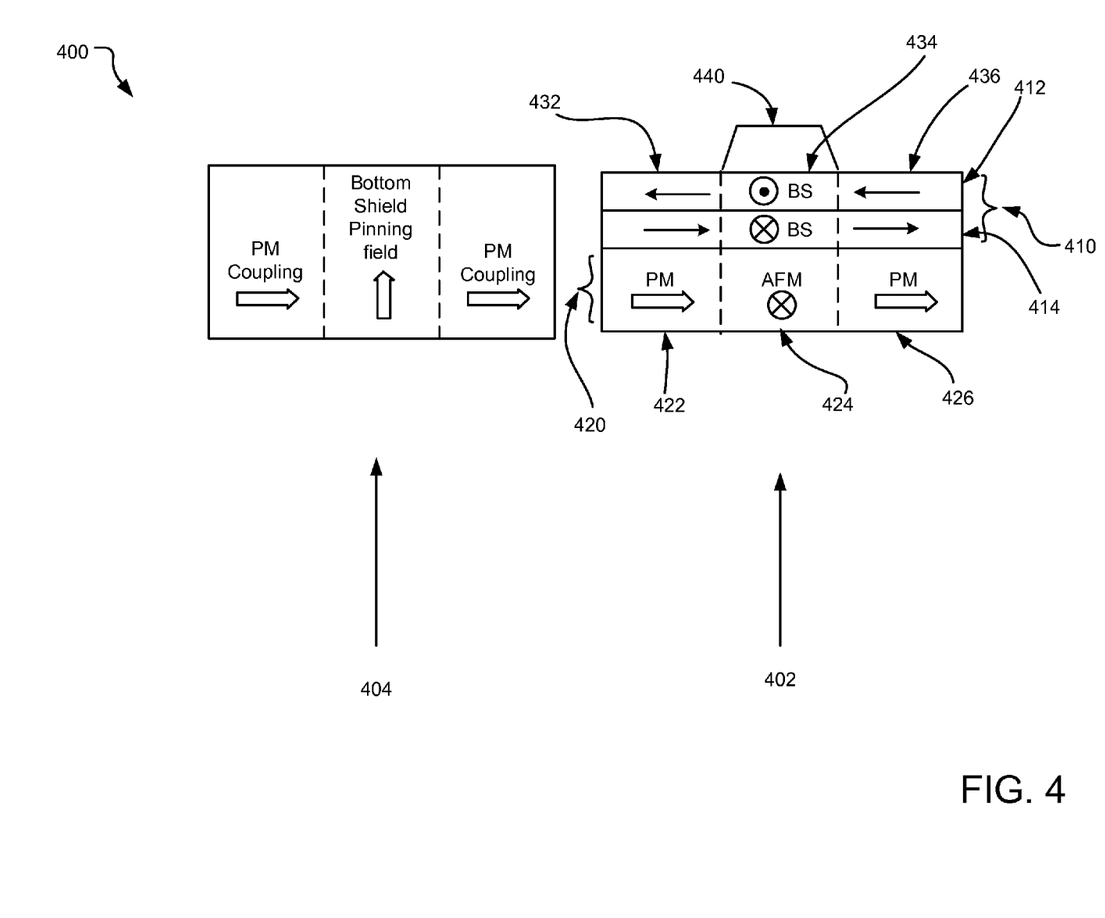
FIG. 4 illustrates an ABS view of an alternative example implementation of an MR sensor.

FIG. 4 illustrates an ABS view 402 and a top view 404 of an alternative example implementation of an MR sensor 400. Specifically, the ABS view 402 illustrates a bottom shield 410 including an RL 412 and a PL 414. The RL 412 and the PL 414 are separated by a thin layer of non-magnetic material (not shown), such as ruthenium (Ru) to provide RKKY coupling between the RL 412 and the PL 414. The MR sensor 400 also includes an AFM/PM layer 420 on a side of the bottom shield (in a down-track direction). The AFM/PM layer 420 may be divided into three sections in a cross-track direction, namely a left PM layer 422, a center AFM layer 424, and a right PM layer 426.

As illustrated in the ABS view 402, each of the left PM layer 422 and the right PM layer 426 provides pinning fields that are parallel to the ABS. On the other hand, the center AFM layer 424 provides pinning field that is transverse to the ABS (as shown by the field into the paper). As a result, the direction of magnetization in the bottom shield 410 also varies depending on the cross-track location within the bottom shield 410. Specifically, in the center section 434 of the bottom shield 410, the direction of magnetization is transverse to the ABS, whereas the directions of pinning in the left section 432 and the right section 436 of the bottom shield 410 are parallel to the ABS.

The MR sensor 400 also includes a sensor stack 440 that is adjacent to the bottom shield 410. In one implementation, the sensor stack 440 is adjacent to the center section 434 of the bottom shield 410. Providing cross-track magnetization in sections 422 and 426 results in increased stability of the MR sensor. In other words, such cross-track magnetization reduces the flipping of the free layer (not shown) within the sensor stack 440 in response to coupling of the free layer to a writer element or an exterior stray field.

Figure 5:
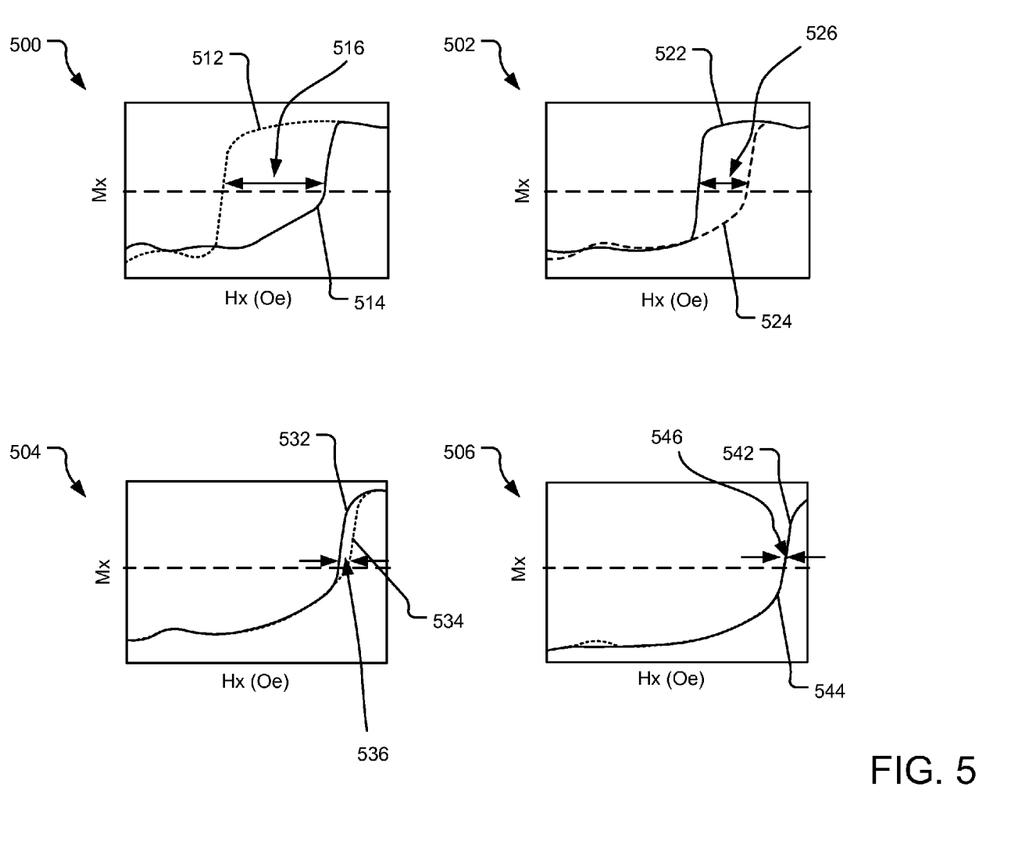
FIG. 5 illustrates magnetization of bottom shield area beneath a free layer, in a cross-track direction, for the MR sensor disclosed herein.

FIG. 5 illustrates transfer curves 500-506 of various bottom shield structures disclosed herein. Specifically, the transfer curves 500-506 illustrate the magnetization in the bottom shield having an SAF layer adjacent to the sensor stack. In each of the transfer curves 500-506, the y-axis denotes the magnetization levels Mx of bottom shield area beneath the free layer of the sensor stack in the cross-track direction and the x-axis denotes the strength of magnetic field Hx applied in the cross-track direction.

The transfer curve 500 is for an implementation of bottom shield where there is no window provided in the center of the bottom shield so the whole bottom shield has transverse magnetization. For the transfer curve 500, the lines 512 and 514 denote two states for the magnetization of the bottom shield (also known as cross-track hysteresis). Specifically, zero level of bottom shield magnetization Mx, is achieved at two different magnetic fields Hx, as shown by the gap 516.

The transfer curve 502 is for an implementation of bottom shield where a 400 nm window is provided in the center of the bottom shield (in cross-track direction), below the sensor stack free layer, having transverse magnetization while he rest of the shield is magnetized in the cross-track direction. As shown, the gap 526 is narrower compared to the gap 516. The magnetization map 504 is for an implementation of bottom shield where a 200 nm window is provided in the center of the bottom shield (in cross-track direction), below the sensor stack free layer, having transverse magnetization. As shown, the gap 536 is narrower compared to the gaps 516 and 526.

The magnetization map 506 is for an implementation of bottom shield where a 100 nm window is provided in the center of the bottom shield (in cross-track direction), below the sensor stack free layer, having transverse magnetization. As shown, the gap 546 is almost non-existent, and therefore narrower compared to the gaps 516, 526 and 536. Thus, providing for the center section of the bottom shield with direction of magnetization that is transverse to the ABS results in reduction of the cross-track hysteresis and increase in the stability of the MR sensor.

Figure 6:
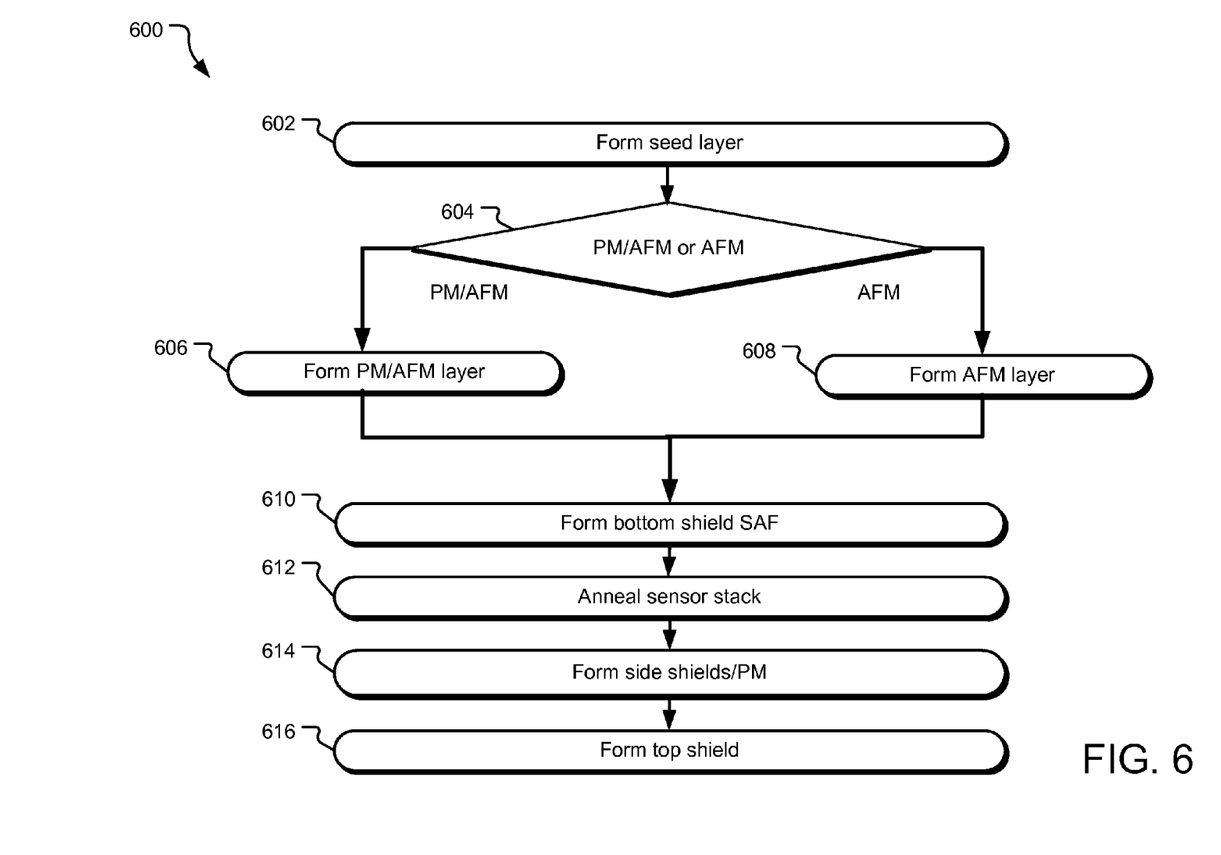
FIG. 6 illustrates example operations illustrating manufacturing a MR sensor illustrated herein.

FIG. 6 illustrates example operations 600 illustrating manufacturing a MR sensor illustrated herein. An operation 602 forms a seed layer on which one or more layers of the MR sensor may be formed. A determination operation 604 determines whether an AFM layer structure is used to pin the bottom shield or a combination of AFM/PM is used. Based on the determination, either of an AFM layer or a combination of an AFM layer and PM layer is formed at one of operations 606 and 608. Subsequently, a SAF structure for the bottom shield is formed at an operation 610. Subsequently, an operation 612 forms a sensor stack. An operation 614 forms side shield or PMs on the sensor stack and finally an operation 616 forms a top shield on the combined structure of sensor stack and side shields/PMs.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus, comprising:
   a bottom shield, a free layer on a first side of the bottom shield, wherein a first portion of the bottom shield substantially adjacent the free layer is pinned so as to generate a pinning field having a component substantially transverse to an air-bearing surface (ABS) of the apparatus and a second portion of the bottom shield not substantially adjacent the free layer is pinned parallel to the ABS of the apparatus; and
   an AFM layer structure comprising at least two sections for pinning the first portion of the bottom shield and the second portion of the bottom shield.

2. The apparatus of claim 1 wherein the free layer is part of a sensor stack.

3. The apparatus of claim 1 wherein the bottom shield comprises a first synthetic antiferromagnetic (SAF) structure.

4. The apparatus of claim 3 wherein the SAF structure comprises a reference layer and a pinned layer separated by a non-magnetic layer.

5. The apparatus of claim 3 further comprising an antiferromagnetic (AFM) layer on a second side of the bottom shield, the second side being opposite the first side in a down-track direction.

6. The apparatus of claim 5, wherein the AFM layer further comprises:
   a left AFM layer with pinning field parallel to the ABS of the apparatus;
   a right AFM layer with pinning field parallel to the ABS of the apparatus; and
   a center AFM layer, between the right AFM layer and the left AFM layer in the cross-track direction and having pinning field with a component substantially transverse to the ABS of the apparatus.

7. The apparatus of claim 6, wherein the cross-track width of the center AFM layer is between 200 nm and 800 nm.

8. The apparatus of claim 6, wherein cross-track width of the center AFM layer is substantially similar to cross-track width of the free layer.

9. The apparatus of claim 3 further comprising a combined antiferromagnetic (AFM)/permanent magnet (PM) layer on a second side of the bottom shield, the second side being opposite the first side in a down-track direction.

10. The apparatus of claim 9, wherein the combined AFM/PM layer further comprises:
    a left PM layer with pinning field parallel to the ABS of the apparatus;
    a right PM layer with pinning field parallel to the ABS of the apparatus; and
    a center AFM layer, between the right PM layer and the left PM layer in the cross-track direction and having pinning field with a component substantially transverse to the ABS of the apparatus.

11. The apparatus of claim 9, wherein the center AFM layer pins a bottom shield section in a direction transverse to the ABS, wherein the center bottom shield section is substantially in adjacent to the free layer.

12. The apparatus of claim 10, wherein cross-track width of the AFM layer substantially spans the cross-track width of the free layer.

13. A reader comprising:
    a sensor stack including a free layer and a barrier layer, wherein the sensor stack is located between a top shield and a bottom shield in a down-track direction;
    wherein a first portion of the bottom shield substantially adjacent the free layer is pinned transverse to an air-bearing surface (ABS) of the reader and a second portion of the bottom shield not substantially adjacent the free layer is pinned parallel to the ABS of the reader; and
    an AFM layer structure comprising at least two sections for pinning the first portion of the bottom shield and the second portion of the bottom shield.

14. The reader of claim 13 wherein the bottom shield further comprises an SAF structure.

15. The reader of claim 14 wherein the cross-track width of the first portion of the bottom shield and the cross-track width of the free layer are substantially the same at the ABS and they span substantially the same length in a cross-track direction.

16. The reader of claim 14 wherein the cross-track width of the first portion of the bottom shield is substantially between 200 nm and 800 nm.

17. The reader of claim 14 wherein the AFM layer structure includes a center AFM layer with pinning field transverse to the ABS.

18. A device comprising:
    a free layer;
    a bottom shield, wherein a center portion of the bottom shield substantially adjacent the free layer is pinned transverse to an air-bearing surface (ABS) of the device, a left portion of the bottom shield not substantially adjacent the free layer is pinned parallel to the ABS of the apparatus, and a right portion of the bottom shield not substantially adjacent the free layer is pinned parallel to the ABS of the device;
    an AFM layer structure comprising at least two sections for pinning the center portion, the left portion, and the right portion of the bottom shield.

19. The device of claim 18 wherein the AFM layer structure includes a center AFM layer, a left PM layer, and a right PM layer.

20. The device of claim 19, wherein cross-track width of the center AFM layer is similar to the cross-track width of the free layer.

* * * * *